(12) United States Patent
Lerman et al.

(10) Patent No.: US 6,714,941 B1
(45) Date of Patent: Mar. 30, 2004

(54) LEARNING DATA PROTOTYPES FOR INFORMATION EXTRACTION

(75) Inventors: Kristina Lerman, Los Angeles, CA (US); Steven Minton, El Segundo, CA (US)

(73) Assignee: University of Southern California, Los Angeles, CA (US)

(*) Notice: Subject to any disclaimer, the term of this patent is extended or adjusted under 35 U.S.C. 154(b) by 483 days.

(21) Appl. No.: 09/620,062

(22) Filed: Jul. 19, 2000

(51) Int. Cl.[7] ............................................. G06F 17/30
(52) U.S. Cl. ..................... 707/103; 707/100; 707/102; 707/104; 704/254
(58) Field of Search ............... 707/3, 10, 6, 101, 707/102, 200, 513, 5, 103, 104, 201; 709/213, 219, 229; 705/514; 717/8; 345/709; 704/9, 254

(56) References Cited

U.S. PATENT DOCUMENTS

| | | | |
|---|---|---|---|
| 5,530,852 A | | 6/1996 | Meske, Jr. et al. ............ 709/206 |
| 5,598,557 A | | 1/1997 | Doner et al. .................... 707/5 |
| 5,649,186 A | | 7/1997 | Ferguson ...................... 707/10 |
| 5,689,706 A | * | 11/1997 | Rao et al. ...................... 707/201 |
| 5,724,567 A | | 3/1998 | Rose et al. ..................... 707/2 |
| 5,778,397 A | | 7/1998 | Kupiec et al. ............... 707/500 |
| 5,787,435 A | | 7/1998 | Burrows ...................... 707/102 |
| 5,819,258 A | | 10/1998 | Vaithyanathan et al. ....... 707/2 |
| 5,832,494 A | | 11/1998 | Egger et al. ................. 707/102 |
| 5,848,186 A | | 12/1998 | Wang et al. ................. 382/176 |
| 5,864,848 A | | 1/1999 | Horvitz et al. ................. 707/6 |
| 5,913,214 A | | 6/1999 | Madnick et al. .............. 707/10 |
| 5,918,229 A | * | 6/1999 | Davis et al. .................... 707/10 |
| 5,958,008 A | | 9/1999 | Pogrebisky et al. ......... 709/223 |
| 5,983,180 A | * | 11/1999 | Robinson ...................... 704/254 |
| 5,987,506 A | * | 11/1999 | Carter et al. ................ 709/213 |
| 5,999,664 A | | 12/1999 | Mahoney et al. ............ 382/305 |
| 6,003,039 A | * | 12/1999 | Barry et al. ............. 707/103 R |
| 6,021,409 A | | 2/2000 | Burrows ..................... 707/102 |
| 6,026,410 A | * | 2/2000 | Allen et al. .............. 707/104.1 |
| 6,078,924 A | * | 6/2000 | Ainsbury et al. ............ 707/101 |
| 6,081,883 A | * | 6/2000 | Popelka et al. ............... 712/28 |
| 6,085,186 A | * | 7/2000 | Christianson et al. .......... 707/3 |
| 6,092,086 A | * | 7/2000 | Martin et al. ................ 707/202 |
| 6,102,969 A | * | 8/2000 | Christianson et al. .......... 717/8 |
| 6,105,044 A | * | 8/2000 | DeRose et al. ............. 705/514 |
| 6,175,835 B1 | * | 1/2001 | Shadmon ..................... 707/102 |
| 6,208,993 B1 | * | 3/2001 | Shadmon ..................... 707/102 |
| 6,233,575 B1 | * | 5/2001 | Agrawal et al. ............... 707/6 |
| 6,327,594 B1 | * | 12/2001 | Van Huben et al. ........ 707/200 |
| 6,340,977 B1 | * | 1/2002 | Lui et al. .................... 345/709 |
| 6,389,436 B1 | * | 5/2002 | Chakrabarti et al. ........ 707/513 |
| 6,438,543 B1 | * | 8/2002 | Kazi et al. ..................... 707/5 |
| 6,446,092 B1 | * | 9/2002 | Sutter ......................... 707/203 |
| 6,487,600 B1 | * | 11/2002 | Lynch ......................... 709/229 |
| 6,510,406 B1 | * | 1/2003 | Marchisio ...................... 704/9 |
| 6,606,625 B1 | * | 8/2003 | Muslea et al. .................. 707/6 |
| 6,622,147 B1 | * | 9/2003 | Smiga et al. ............... 707/102 |
| 2001/0054090 A1 | * | 12/2001 | Jung et al. .................. 709/219 |
| 2002/0019825 A1 | * | 2/2002 | Smiga et al. ............... 707/102 |
| 2002/0118220 A1 | * | 8/2002 | Lui et al. .................... 345/709 |

OTHER PUBLICATIONS

May, "An Intergrated Architecture for Exploring, Wrapping, Mediating and Restructuring Information from the Web", IEEE, Feb. 2000, pp. 1–8.*

Liu et al., "XWRAP: an XML–enabled wrapper construction system for Web information sources", IEEE, Mar. 2000, pp. 1–11.*

* cited by examiner

Primary Examiner—Thuy N. Pardo
(74) Attorney, Agent, or Firm—Cislo & Thomas LLP

(57) ABSTRACT

A method for determining statistically significant token sequences lends itself for use in the recognition of broken wrappers as well as the construction of new wrapper rules. When new wrapper rules are needed as the underlying wrapped data has changed, training examples are used to recognized data rule candidates that are culled with a bias for rule candidates that would be probably more successful. The resulting rule candidate set is clustered according to feature characteristics, then compared to the training examples. Those rule candidates most similar to the training examples are used to create new wrapper rules.

22 Claims, 2 Drawing Sheets

The token type syntactic hierarchy.
Dots indicate the existence of additional types.

The token type syntactic hierarchy.
Dots indicate the existence of additional types.

Figure 2

DATAPRO MAIN LOOP
Create root node of tree;
For next node Q of tree
    Create children of Q;
    Prune generalizations ;
    Determinize children;
Extract patterns from tree;

CREATE CHILDREN OF Q
For each token type T at next position in examples
    Let C = NewNode;
    Let C.token = T;
    Let C.examples = Q.examples that are followed by T;
    Let C.count = |C.examples |;
    Let C.pattern = concat(Q.pattern, T);
    If Significant(C.count, Q.count, T.probability, a)
        AddChildToTree(C, Q)

PRUNE GENERALIZATIONS
For each child C of Q
    Let N = C.count − $S_i$ ($S_i$.count | $S_i$ ∈ {Siblings(C)} & $S_i$.pattern ⊂ C.pattern);
    If Not(Significant(N, Q.count, C.token.probability, a))
        Delete C;

DETERMINIZE CHILDREN OF Q
For each child C of Q
    For each sibling S of C
    If S.pattern ⊂ C.pattern
        Delete S.examples from C.examples
        C.count = |C.examples |

EXTRACT PATTERNS FROM TREE
Create empty list;
For every node Q of tree
    For every child C of Q
        Let N = C.count − $S_i$ ($S_i$.count | $S_i$ ∈ {Children(C)}
        If Significant( N, Q.count, C.token.probability, a)
            Add C.pattern to the list;
    Return (list of patterns);

LEARNING DATA PROTOTYPES FOR INFORMATION EXTRACTION

BACKGROUND OF THE INVENTION

1. Field of the Invention

This invention relates to data mining, and more particularly to a system that determines data characteristics for processing purposes and applications. By determining data characteristics, recognition and extraction of data for information processing purposes is facilitated.

2. Description of the Related Art

The proliferation of online information sources has accentuated the need for tools that automatically validate and recognize data. As the size and diversity of online information grows, many of the common transactions between humans and online information systems are being delegated to software agents. Price comparison and stock monitoring are just two examples of the tasks that can be assigned to an agent. Many protocols and languages have been designed to facilitate information exchange, from primitive EDI protocols to more modern languages like XML and KQML. However, these schemes all require that the agents conform to syntactic and semantic standards that have been carefully worked out in advance. Humans, in contrast, get by with only informal conventions to facilitate communications, and rarely require detailed pre-specified standards for information exchange.

In examining typical web pages—at electronic catalogs, financial sites, etc.—we find that information is laid out in a variety of graphical arrangements, often with minimal use of natural language. People are able to understand web pages because they have expectations about the structure of the data appearing on the page and its physical layout. For instance, if in looking at online Zagat's restaurant guide, one finds a restaurant's name, an address, a review, etc. Though none of these are explicitly labeled as such, the page is immediately understandable because people expect this information to be on the page, and have expectations about the appearance of these fields (e.g., people know that a U.S. address typically begins with a street address and ends with a zip code). The layout of the page helps to demarcate the fields and their relationships (e.g., the restaurant name is at the top of the page; the phone and address appear close together, etc.)

Several researchers have addressed the problem of learning the structure of data. Grammar induction algorithms, for example, learn the common structure of a set of strings. Carrasco and Oncina (1994) propose ALERGIA, a stochastic grammar induction algorithm that learns a regular language given the strings belonging to the language. ALERGIA starts with a finite state automaton (FSA) that is initialized to be a prefix tree that represents all the strings of the language. The FSA is generalized by merging pairs of statistically similar subtrees. ALERGIA tends to merge too many states, even at a high confidence limit, leading to an over-general grammar. The resulting automation frequently has loops in it, corresponding to regular expressions like a(b*)c. However, the data in a single field is seldom described by such repeated structures.

Goan et al. (1996) proposed modifications to ALERGIA aimed at reducing the number of bad merges. They also introduced syntactic categories similar to ones in the present invention. Each symbol can belong to one of these categories. Goan et al. added a new generalization step in which the transitions corresponding to symbols of the same category that are approximately evenly distributed over the range of that category (e.g., 0–9 for numerals) are replaced with a single transition. Though the proposed modifications make the grammar induction algorithm more robust, the final FSA is still sensitive to the merge order. Moreover, it does not allow for multi-level generalization, found to be useful. The algorithm requires dozens, if not hundreds, of examples in order to learn the correct grammar.

FOIL (Quinlan 1990) is a system that learns first order predicate logic clauses defining a class from a set of positive and negative examples of the class. FOIL finds a discriminating description that covers many positive and none of the negative examples.

FOIL.6 (Quinlan 1990) was used with '−n' option (no negative literals) to learn data prototypes for several data fields. In all cases, the closed world assumption was used to construct negative examples from the known objects; thus, names and addresses were the negative examples for the phone number class for a white pages source. In most cases there were many similarities between the clauses learned by FOIL and the patterns learned by DataPro™ (the name of the system of the present invention); however, the descriptions learned by FOIL tended to be overly general. Thus, if the rule learned from the example was that a '(' was a sufficient description of phone numbers in the presence of examples of addresses and names, such a description cannot be generalized as '(' will not be sufficient to recognize phone numbers on a random page. Such over-generalization may arise from the incompleteness of the set of negative examples presented to FOIL. Another problem arises when FOIL is given examples of a class with little structure, such as names and book titles. FOIL tends to create clauses that only cover a single example, or fails altogether to find any clauses.

SUMMARY OF THE INVENTION

The present invention provides an efficient algorithm that learns structural information about data from positive examples alone. Two Web wrapper maintenance applications may employ this algorithm. The first application detects when a wrapper is not extracting correct data. The second application automatically identifies data on Web pages so that the wrapper to may be re-induced when the source format changes.

An important aspect of the present invention is that it focuses on generalizing token sequences according to a type hierarchy. Most previous work in the area has focused on generalizations that capture repeated patterns in a sequence (e.g., learning regular expressions). Though this direction has not yet attracted much attention, it is believed that it will prove useful for a wide variety of data validation tasks.

Future possibilities for the DataPro™ algorithm of the present invention include cross-site extraction, e.g., learning the author, title and price fields for the Amazon site, and using them to extract the same fields on the Barnes & Noble web site. Preliminary results show that this is feasible, though challenging. Additionally, the DataPro™ approach may be used to learn characteristic patterns within data fields (as opposed to just start and end patterns). The algorithm is efficient enough to be used in an "unanchored" mode, and there are many applications where this would be useful.

The present art is advanced by the present invention which provides a machine method for acquiring expectations about the content of data fields. The method learns structural information about data to recognize restaurant names, addresses, phone numbers, etc. This present invention provides two applications related to wrapper induction that utilize structural information. A web page wrapper is a program that extracts data from a web page. For instance, a Zagat's wrapper might extract the address, phone number, review, etc., from Zagat's pages. Zagat's restaurant web site presents information regarding restaurants, including reviews. The first application involves verifying that an existing wrapper is extracting correctly. The second application involves re-inducing a wrapper when the underlying format of a site changes. Although the present invention may focus on web applications, the learning technique is not web-specific, and can be used to learn about text and numeric fields in general. It is contemplated that the present invention is a step towards true agent interoperability, where agents can exchange and aggregate data without needing to know in advance about the detailed syntactic and semantic conventions used by their partners.

OBJECTS OF THE INVENTION

It is an object of the present invention to provide a method for learning the structure of data fields.

It is an object of the present invention to provide a process by which data in a semi-structured form may be made subject to extraction.

It is an object of the present invention to facilitate wrapper generation for web pages.

It is an object of the present invention to provide a process for verifying the integrity and reliability of information extracted by a wrapper.

It is an object of the present invention to provide a process to re-induce wrapper rules when the structure of underlying data has been changed.

These and other objects and advantages of the present invention will be apparent from a review of the following specification and accompanying drawings.

BRIEF DESCRIPTION OF THE DRAWINGS

FIG. 2 is a pseudocode listing for the DataPro™ algorithm used in the present invention.

DESCRIPTION OF THE PREFERRED EMBODIMENT(S)

Figure 1:
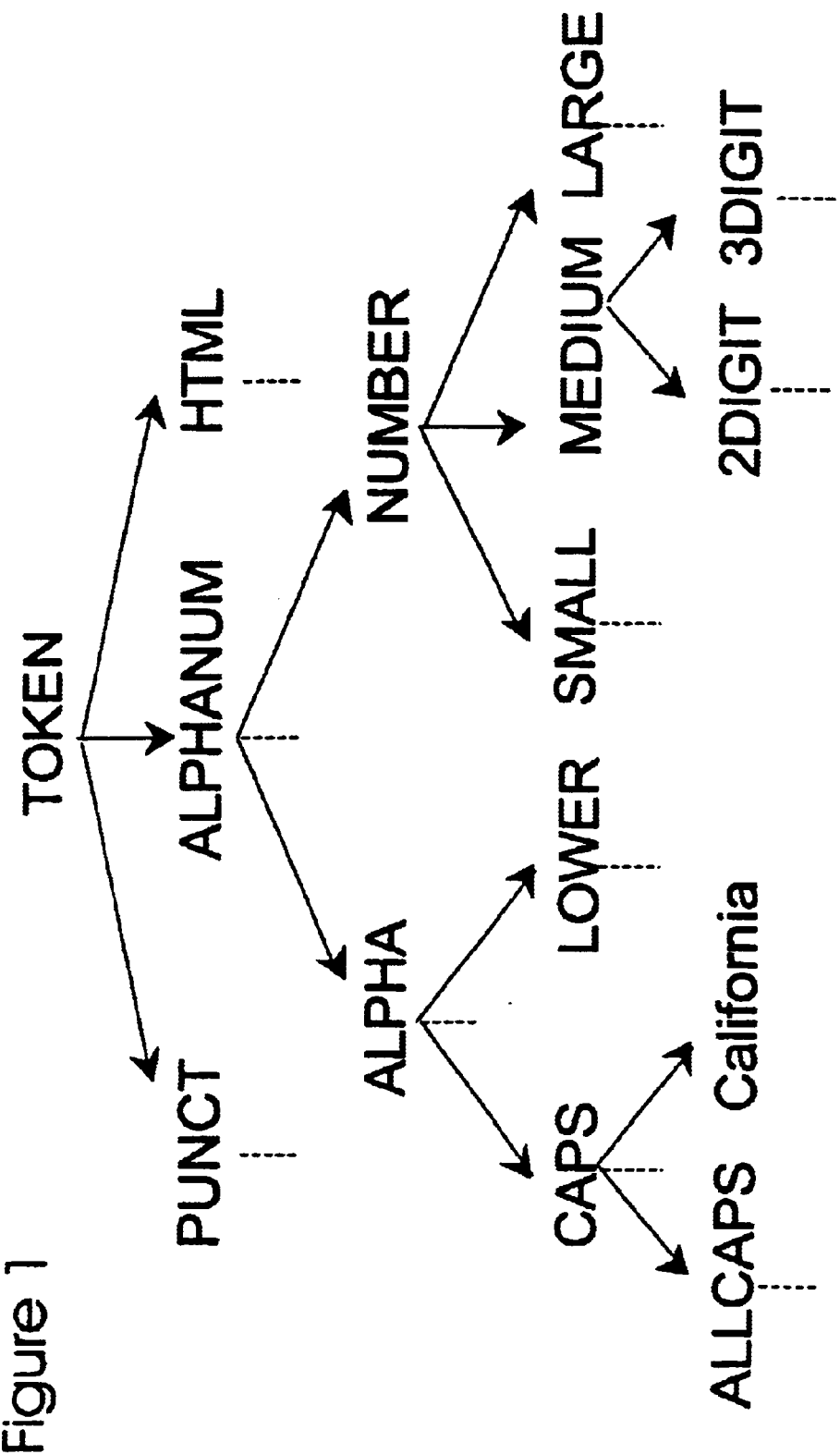
FIG. 1 is a schematic view of a data structure generated by the present invention.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

An objective of the present invention is to learn the structure of data fields, such as street addresses, telephone numbers, zip codes, etc. in web pages or other semi-structured data sets. One example of a street address is "4676 Admiralty Way." In the art, the structure of information extracted from web pages has been described by a sequence of characters or by a collection of global features, such as the number of words and the density of numeric characters. The present invention provides an intermediate work-level representation that balances the descriptive power and specificity of the character-level representation with the compactness and computational efficiency of the global representation. Words, or more accurately tokens, are strings generated from an alphabet containing different types of characters: alphabetic, numeric and punctuation. Use may be made of the token's character types to assign it to one or more syntactic categories: alphabetic, numeric, etc. These categories form a hierarchy as depicted in FIG. 1. The arrows point from general to less general categories. A unique token type is created for every string that appears in at least k examples, as determined in a preprocessing step. This step eliminates tokens that occur infrequently, thus not all information present in a data file necessarily becomes a token. It must meet the pre-processing threshold.

The hierarchical representation allows for multi-level generalization. Thus, for example, the token "California" 100 belongs to the general token types ALPHANUM 102 (alphanumeric strings), ALPHA 104 (alphabetic strings), CAPS 106 (capitalized words), as well as to the specific type representing the string "California" 100. This representation is flexible and may be expanded to include domain-specific information. For example, range may be added to the number category (e.g., small to gigantic numbers, 1-, 2-, 3-digit numbers), or explicitly include knowledge about the type of information being parsed.

The present invention contemplates that a sequence of specific and general tokens is more useful for describing common data fields than finite state representations used previously.

For complex fields, and for purposes of information extraction, it is sufficient to use only the starting and ending sequences as the description of the data field. For example, a set of street addresses—"4676 Admiralty Way", "220 Lincoln Boulevard" and "998 South Robertson Boulevard" —start with a sequence "NUM CAPS" and end with "Boulevard" or "CAPS." The starting and ending patterns together define a "data prototype," which is similar to prior prototypical concept descriptions. The patterns in the data prototype are not regular expressions, since they do not allow loops or recursion. The present invention contemplates that recursive expressions tend to over-generalize and that they are not useful representations of the type of data that need to be learned.

The problem of learning the data prototype from a set of examples that are labeled as belonging (or not) to a class, may be stated in one of two related ways: as a classification task or as a conservation task.

In the classification task, both the positive and the negative instances of the class are used to learn a rule that correctly classifies new examples. Classification algorithms, like FOIL, use negative examples to guide the specialization of the sought-after rule. They attempt to construct "discriminating descriptions," that are satisfied by all of the positive examples and none of the negative examples.

The conservation task attempts to find a characteristic description or conserved patterns in a set of positive examples of a class. Unlike the discriminating description, the characteristic description will often include redundant features. When negative examples are not known or available to the learning algorithm, redundant features may help correctly identify new instances of the class. The characteristic description learned from positive examples is the same as the discriminating description learned by the classification algorithm in the presence of negative examples drawn from infinitely many classes. While most of the widely used machines learning algorithms (decision trees and ILP) solve the classification task, fewer algorithms that learn characteristic descriptions are in use.

In the present invention, an appropriate source of negative examples is problematic; therefore, the present invention frames the learning problem as a conservation task. The present invention provides a system denominated herein as DataPro™—an algorithm that learns data prototypes from positive examples. DataPro™ finds statistically significant sequences of tokens, i.e., those that describe many of the positive instances, but are highly unlikely to be a description of a random sequence of tokens. DataPro™ is a statistical algorithm; therefore, it tolerates noisy data. The training examples are encoded in a prefix tree, where each node corresponds to a token type (specific or general category), and a path through the tree corresponds to a sequence of tokens. The present invention provides a greedy polynomial time version algorithm that relies on significance judgments to grow the tree and prune the nodes.

A sequence of tokens is significant if it occurs more frequently than would be expected if the tokens were generated randomly and independently of one another. We begin by estimating the baseline probability of a token's occurrence from the proportion of all tokens in the training examples that are of that type. Suppose that a significant token sequence has already been found—e.g., the pattern consisting of the single token "NUM" —in a set of street addresses such as the ones above, and want is present to determine whether the more specific pattern, "NUM CAPS", is also a significant pattern. Knowing the probability of occurrence of type CAPS, computation can be made as to how many times CAPS can be expected to follow NUM completely by chance. If observation is made of a considerably greater number of these sequences, a valid conclusion is that the longer pattern is significant and probably not random or mere noise.

Formally, the present invention uses "hypothesis testing" to decide whether a pattern is significant. The null hypothesis is that observed instances of this pattern were generated by chance, via the random, independent generation of the individual tokens. Hypothesis testing decides, at a given confidence level, whether the data supports rejecting the null hypothesis. Suppose n identical sequences have been generated by the random source. The probability that a token T (whose overall probability of occurrence is p) will be the next token in k of these sequences has a binomial distribution. For a large n, the binomial distribution approaches a normal distribution $P(\chi, \mu, \sigma)$ with $\mu=np$ and $\sigma^2=np(1-p)$. The cumulative probability is the probability of observing at least $n_1$ events is:

$$P(k \geq n_1) = \int_{n_1}^{\infty} P(x, \mu, \sigma) dx$$

Approximation formulas may be used to compute the value of the integral.

The significance level of the test, $\alpha$, is the probability that the null hypothesis is rejected even though it is true, and it is given by the cumulative probability above. Suppose $\alpha=0.05$. This means that there is an expectation to observe $n_1$ or more events 5% of the time under the null hypothesis. If the number of observed events is greater, the null hypothesis may be rejected (at the given significance level), i.e., the observation is significant. Note should be taken that the tested hypothesis is derived from observation (data). Therefore, the number one must be subtracted from the number of observed events to take into account the reduction in the number of degrees of freedom. This also prevents the anomalous case when a single occurrence of a rare event is judged to be significant.

As denominated herein, DataPro™ is the algorithm that finds statistically significant patterns in a set of token sequences. Focus is made herein on the version of the algorithm that learns the starting patterns. The algorithm can be easily adapted to learn the ending patterns as by applying the techniques set forth herein to the file in reverse, i.e., from the file's end and working toward the beginning.

During the preprocessing step, the text is tokenized, and the tokens are assigned syntactic types (see FIG. 1), as described previously. The algorithm builds a prefix tree, in which each node corresponds to a token whose position in the sequence is given by the node's depth in the tree. Every path through the tree starting at the root node is a significant pattern found by the algorithm.

The tree is grown incrementally. Adding a child to a node corresponds to extending the node's pattern by a single token. Thus the children of a node each represent a different way to specialize the pattern. For example, when learning city names, the node corresponding to "New" might have three children, corresponding to the patterns "New Haven", "New York" and "New CAPS".

As indicated above, a child node is judged to be significant with respect to its parent node if the number of occurrences of the child pattern is sufficiently large, given the number of occurrences of the parent pattern and the baseline probability of the token used to extend the parent pattern. A pruning step ensures that each child node is also significant given its more specific siblings. For example, if there are 10 occurrences of "New Haven", and 12 occurrences of "New York", and both of these are judged to be significant, then "New CAPS" as an individual token entity will be retained only if there are significantly more than 22 examples that match "New CAPS". Otherwise, the "New CAPS" node is superfluous as it provides a step, or level, in the syntactic tree that is not needed.

Similarly, once the entire tree has been expanded, the algorithm includes a pattern extraction step that traverses the tree, checking whether the pattern "New" is still significant given the more specific patterns "New York", "New Haven" and "New CAPS". In other words, the present invention decides whether the examples described by "New" (but not by any of the longer sequences) can be explained by the null hypothesis.

We present the pseudocode of the DataPro™ algorithm of the present invention below and describe it in greater detail. This pseudocode is also shown in FIG. 2.

DATAPRO™ MAIN LOOP
Create root node of tree;
For next node Q of tree
   Create children of Q;
   Prune generalizations;
   Determine children;
Extract patterns from tree;
CREATE CHILDREN OF Q
For each token type T at next position in examples
   Let C=NewNode;
   Let C.token=T;
   Let C.examples=Q.examples that are followed by T;
   Let C.count=|C.examples|;
   Let C.pattern=concat(Q.pattern, T);
   If Significant(C.count, Q.count, T.probability, $\alpha$)
     AddChildToTree(C, Q)

PRUNE GENERALIZATIONS
For each child C of Q
    Let N=C.count$-\Sigma_i$ ($S_i$.count$|S_i \in$ {Siblings(C)} &
    $S_i$.pattern $\subset$ C.pattern);
    If Not(Significant(N, Q.count, C.token.probability, $\alpha$))
        Delete C;
DETERMINIZE CHILDREN OF Q
For each child C of Q
    For each sibling S of C
        If S.pattern $\subset$ C.pattern
            Delete S.examples from C.examples
            C.count=|C.examples|
EXTRACT PATTERNS FROM TREE
Create empty list;
For every node Q of tree
    For every child C of Q
        Let N=C.count$-\Sigma_i$ ($S_i$.count$|S_i \in$ {Children(C)}
        If Significant (N, Q.count, C.token.probability, $\alpha$)
            Add C.pattern to the list;
    Return (list of patterns);

The DataPro™ systems grows the prefix tree greedily by finding specializations of the significant patterns and pruning generalizations. The tree is empty initially, and children are added to the root node. The children represent all tokens that occur in the first position in the training examples more often than expected by chance. The tree is extended incrementally at node Q. A new child is added to Q for every significant specialization of the pattern ending at In the pruning step, the algorithm checks the children of Q to determine whether the generalizations are significant given the specific patterns. In our notation, $A \subset B$ means that B is a generalization of A. Next, the examples that are explained by any significant patterns are deleted from its sibling generalizations. We refer to this as determinizing the tree, because it ensures that every sequence of tokens in the training data is used as evidence, or indication, for at most one pattern in the tree. In this way, redundancy of elements in the tree are avoided as it is preferable to have every example present in the tree only once and properly classified with specialization, or differentiation, preferred over generalization. Different procedures have been subject to experiment. It has been found to be more useful to not prune the children of the root node, because early pruning may appreciably reduce the number of examples available to the algorithm.

The algorithm can in principle be implemented more efficiently than in the pseudocode. The algorithm needs to examine each prefix (a subsequence with which the examples begin) a constant number of times. Given N training examples, the longest one containing L tokens, there are O(AN) prefixes. The size of the tree is, therefore, also O(AN). Pruning and determinization can be folded into node creation, and will not affect the complexity of the algorithm. Note should be taken that the algorithm is efficient because the tree is determined; otherwise, the tree grows exponentially. The complexity of the last step, extracting patterns from tree, is also O(NL).

Application 1: Wrapper Verification

A common problem experienced by information integration applications is wrapper fragility. A Web wrapper is a program that takes a query, retrieves a page from a Web source using the query, and extracts results from it. Many wrappers use layout of HTML pages to extract the data. Therefore, they are vulnerable to changes in the layout, which occur when the site is redesigned. In some cases the wrapper continues to extract, but the data is no longer correct. Wrapper maintenance, i.e., detecting when the wrapper stops working and automatically recovering from failure, is an important problem for information integration research.

The prior art generally lacks solutions to the problem of wrapper maintenance. One system, known as RAPTURE, has been proposed to verify that a wrapper correctly extracts data from a Web page. Each data field is described by a collection of global numeric features, such as word count, average word length, HTML tag density, etc. Given a set of queries for which the wrapper output is known, RAPTURE checks that the wrapper generates a new result with the expected combination of feature values for each of the queries. The HTML tag density feature alone may correctly identify almost all of the changes in the sources monitored. The addition of other features to the probability calculation about the wrapper's correctness may significantly reduce the algorithm's performance.

The prototypes learned by the present DataPro™ system may lend themselves to the data validation task and, specifically, to wrapper verification.

A set of queries is used to retrieve HTML pages from which the wrapper may extract N training examples. DataPro™ may learn m patterns that describe the common beginnings and endings of each field of the extracts. In the verification phase, the wrapper may generate n test examples from pages retrieved using the same or a similar set of queries. If $t_i$ training examples and $k_i$ test examples match the ith pattern and if the two distributions, k and t, are the same (at some significance level), the wrapper is judged to be extracting correctly; otherwise, it is judged to have failed. The present system allows the addition of other features to the two distributions. In the experiments described below, an added feature is the average number of tuples-per-page feature. A goodness of fit method was used to decide whether the two distributions were the same.

There are three effects that can cause the output of a wrapper to change. The most important effect appears to be the change in the layout of the pages returned by the Web source. Because wrappers use landmarks during extraction, any alterations in the layout tend to break the wrapper. The source can also change the format of the data returned: e.g., the street address field of "Yahoo People Search" dropped street numbers ("Main St" instead of "25 Main St"), or book availability on Borders site changed from "Ships immediately" to "In Stock: ships immediately." It is important to know when these types of changes occur, because information integration applications may be sensitive to data format. Finally, others on a project may alter the way wrappers tokenize and extract results, which may also have an effect on the format of the extracted data as when a wrapper is changed to extract "10.00" instead of "$10.00" for the price, for example.

Twenty-seven wrappers (representing 23 distinct Web sources) were monitored over a period of eight months. For each wrapper, the results of approximately fifteen queries were stored every ten days. All new results were compared with the last correct wrapper output (training examples). The verification algorithm used DataPro™ to learn the starting and ending patterns for each field of the training examples and made a decision at a high significance level (corresponding to $\alpha$=0.001) about whether the patterns had the same distribution over the new examples.

Manual checking of the results identified 32 wrapper changes out of the total 328 comparisons. Of these, 25 were attributed to changes in the source layout and data format, and 7 were attributed to changes internal to the wrappers. The verification algorithm correctly discovered 30 of these changes, including the 15 that would have been missed by the RAPTURE system if it were relying solely on the HTML tag density feature. The algorithm incorrectly decided that the wrapper had changed in 23 cases. The accuracy rate of the algorithm was 92%. Further advancement is believed to be possible to reduce the rate of false positives.

Application 2: Wrapper Maintenance

If the wrapper stops extracting correctly, it is advantageous to rebuild it automatically. The extraction rules for Web wrappers may be generated by machine-based learning algorithms which take as input several pages from the same source and examples of data to extract for each page. Therefore, if identification can be made of the correct examples of data on the pages for which the wrapper fails, these examples can be fed to the wrapper induction algorithm to generate new extraction rules.

The present invention provides a method that takes a set of training examples and a set of pages from the same source, and uses a mixture of supervised and unsupervised learning to techniques to identify the correct examples of data to extract on the new pages. The method assumes that only the layout of the pages has changed, but not the format of the data. First, the DataPro™ system learns the patterns that describe the start and end of each field in the training examples and calculates the mean and variance of the number-of-tokens feature distribution (assuming a normal distribution). The patterns are used to identify the start and is end of many possible examples of the data field on new pages. These possible examples are referred to herein as "data candidates." Candidates containing significantly more or fewer tokens than expected are eliminated from the set, often still leaving hundreds of candidates (in one embodiment up to 300) on each page. The data candidates are clustered according to a set of positional features, including adjacent tokens, the position of the candidate on the page, and whether it is visible to the user. After the clusters, or subsets of candidates that share common positional features, are identified, each cluster is given a score based on how similar it is to the training examples. The highest ranked clusters are expected to contain the correct examples of the data field. Computation of positional features and cluster ranking may be developed in the future.

To evaluate the extraction algorithm, one may pretend or assume that the wrapper has failed, and engage the DataPro™ system to try to extract correct data from Web pages using only the training examples (old data). The new pages are retrieved using the same (or similar) queries that were used to obtain training examples. The output of the extraction algorithm is a ranked list of clusters for every data field being extracted. Each cluster is checked manually, and it is judged to be correct if it contains correct complete examples of the data field, which also appear in the correct position on the page.

In one experiment, the extraction algorithm for 21 distinct Web sources was performed, attempting to extract 77 data fields from all the sources. In 62 of the 71 results in which some data examples were identified, the top ranked cluster contained correct complete instances of the data field. In 6 cases, the second cluster was correct. In 2 cases, the correct cluster was ranked lower. Only in one case was an incomplete example of the field extracted (PRICECHANGE for wrapper "Quote"). All except one cluster were pure, that is, they contained only correct examples of the field.

The table below presents results for six of the wrappers, including the three, in bold, for which the wrapper failed, as determined in the wrapper verification experiment (altavista, amazon, and quote). The first column lists the wrapper name and the number of pages provided to the extraction algorithm. The second column lists the data field that was extracted from the pages. The table also lists the total number of candidates from all pages identified by the data prototype, and the number of the resulting clusters. The last three columns give the rank of the cluster containing correct complete examples of the data field, the number of examples in that cluster, and the percent of the examples that are correct. Note should be taken that even in the case where the correct cluster was ranked low, the top cluster still contained correct examples of that field. For example, the top ranked cluster of author names for the "Amazon" wrapper contained correct complete author names that were extracted from the title of the page. With no additional work, the wrapper, or part of one, can be re-induced for all the sources below, excluding altavista, for which enough examples were not able to be identified.

| wrapper | field | #candid | # clusters | rank | # in cluster | % correct |
|---|---|---|---|---|---|---|
| altavista 20 | TITLE | 896 | 115 | 3 | 5 | 100 |
| | LINK | 570 | 32 | 1 | 14 | 100 |
| amazon 20 | AUTHOR | 1950 | 208 | 2 | 20 | 100 |
| | TITLE | 1030 | 17 | 2 | 8 | 100 |
| | PRICE | 49 | 3 | 1 | 15 | 100 |
| | ISBN | 20 | 2 | 1 | 18 | 100 |
| | AVAILAB. | 18 | 1 | 1 | 18 | 100 |
| arrow 21 | PARTNUM | 1447 | 69 | 1 | 6 | 100 |
| | MANUFAC | 587 | 25 | 1 | 58 | 100 |
| | PRICE | 201 | 2 | 1 | 58 | 100 |
| | DESCRIP. | 718 | 49 | 1 | 58 | 100 |
| | STATUS | 818 | 45 | 1 | 58 | 100 |
| | PRTURL | 0 | | | | |
| bigbook 16 | NAME | 192 | 26 | 1 | 14 | 100 |
| | STREET | 18 | 2 | 1 | 16 | 100 |
| | CITY | 25 | 4 | 1 | 9 | 100 |
| | STATE | 64 | 7 | 1 | 5 | 100 |
| | PHONE | 21 | 1 | 1 | 16 | 100 |
| quote 20 | PRICECH. | 45 | 5 | 0 | 0 | 0 |
| | TICKER | 29 | 5 | 1 | 11 | 100 |
| | VOLUME | 11 | 1 | 1 | 11 | 100 |
| | PRICE | 0 | | | | |
| showtimes 15 | MOVIE | 82 | 10 | 1 | 15 | 100 |
| | TIMES | 238 | 13 | 1 | 15 | 100 |

In extracting data from HTML pages using learned structure according to the present invention, a similar embodiment may be used. With a given set of examples of data successfully extracted from a Web source, a data prototype is learned. The following steps outline an approach of using these learned prototypes to extract data from a new set of Web pages from the same (or a different) Web source.

In learning the data prototype, all patterns that describe the start and end of the data samples are found in a manner similar to the one described above.

The mean and variance of the number-of-tokens distribution (i.e., number of tokens in each data sample) is calculated to provide expectation values for new data/Web pages.

The page template is determined in a manner analogous to Unix diff operations. All sequences of tokens that appear exactly once on each page are found. These sequences define the "skeleton" of the page. The data samples usually appear in the slots between the template elements, a feature that is generally true for the similar unknown data as it is for the known Web pages or training examples.

Data candidates are determined by scanning each new Web page to identify all text segments that begin with one of the starting patterns and end with one of the ending patterns. These segments, or candidates, include desirable data wanted for extraction from the new pages.

The candidates so determined are filtered to eliminate from the set those candidates that contain significantly more or fewer tokens than expected based on the number-of-tokens distribution (at, for example, a 90% significance level).

The candidates are then clustered to identify subsets that share common features. Positional features are used to describe each candidate. The following positional features may be used:

IsVisible=1 if candidate is outside an HTML tag; 2 otherwise;

SlotNumber=index of the page template slot in which candidate appears; 0 if part of template;

PrevToken=value of the token immediately preceding the candidate, assigned a unique numeric value; and/or NextToken=value of the token immediately following the candidate, assigned a unique numeric value.

An agglomerative hierarchical clustering algorithm (SLINK) is used to cluster the candidates. SLINK uses a binary dot product as the similarity measure between two objects (candidates). The value of the binary dot product is 1 when all the features values of two objects are the same, otherwise it is zero. SLINK produces a binary tree (dendogram). Each subtree that starts at a node containing non-zero similarity measure is a separate cluster.

Each cluster is given a score based on how similar it is to the training examples. The similarity score is how many of the old data samples appear in each cluster. The highest ranked cluster is expected to contain the correct examples of the data field and is used or preferred.

Certain useful applications arise from the ability to reinduce wrapper rules once such rules have been "broken". First, wrapper maintenance is more easily achieved as detection and correction of broken rules can be performed on a more automated basis. If and when it cannot be so performed on an automated basis, less human interaction is required, freeing up individuals for more useful and interesting tasks.

Additionally, reinduction can be used when wrapper rules are not broken, just changed. One extremely useful application of reinduction arises from the wrapping of new databases that are similar to known, previously-wrapped databases. When the wrapper of the old, known database is applied to the new, unknown (but similar) database, the wrapper does not "know" that it is wrapping a new database, but only that it is to operate according to its wrapper rules. Consequently, in wrapping the new database, the wrapper provides results that appear to indicate that the wrapper is broken as the results on the new database depart from that of the results on the old database.

Reinduction can then be used to streamline the wrapping of new databases if a wrapper is available for a known, similar database. To do so, the wrapper for the known database is applied to the new database. The results are evaluated and new rules are reinduced where the wrapper is broken.

Databases are currently understood as being "similar" for purposes of reinduction when they present the same or similar information in a different format. One example is addresses which may be presented at the beginning of one set of web pages and at the end of another. As data, addresses are generally similar and wrapper rules applicable to addresses at the beginning of a web page may differ from rules applicable to addresses at the end of a web page. Consequently, while a wrapper rule for an address at the beginning of a web page might break in wrapping a web page with an address at the end, such a broken rule might easily be reinduced to handle the end-of-page address.

An example of the reinduction of a new database arises when, for example, the book-selling web site for Barnes and Noble books (www.barnesandnoble.com) is wrapped with a wrapper for the book-selling web site for Amazon.com (www.amazon.com). The information regarding books is generally the same for both web sites (title, author, publisher, price), but is presented in a different manner. By reinducing the Amazon wrapper for the Barnes and Noble site, a wrapper for the Barnes and Noble site may be generated. Similarly, sites that provide a perspective of information from a variety of other websites, such as My Simon (www.mysimon.com), may provide examples that can be reinduced to provide rules to wrap the original other web sites.

While the present invention has been described with regards to particular embodiments, it is recognized that additional variations of the present invention may be devised without departing from the inventive concept.

What is claimed is:

1. A method for recognizing significant token sequences, the steps comprising:

providing tokenized data, said data having a token sequence, said token sequence having tokens, each of said tokens assigned a number of different hierarchical token types, said token types categorizing each of said tokens;

constructing a prefix tree according to said token types of said token sequence;

pruning a first generalization node among first sibling nodes of said prefix tree when first specific nodes of said first generalization node substantially repeat said first generalization node;

removing token sequence patterns from a second generalization node that are repeated in second sibling nodes to said second generalization node, said second sibling nodes being specific nodes of said second generalization node; and returning a token sequence pattern from a node of said prefix tree when a difference between a number of occurrences of said pattern and a number of occurrences of patterns of children of said node is significant with respect to a number of occurrences of said pattern in a parent node to said node; whereby said token sequence pattern indicates a type of information when information manifests said token sequence pattern so that said information may be recognized for its type.

2. A method for recognizing data fields in a data collection, the steps comprising:

pre-processing the data collection to provide a syntactic hierarchy tree of tokens;

determining statistically significant token patterns in the data collection;

providing examples of desired data fields; and establishing a prefix tree for said desired data fields according to said statistically significant token patterns; whereby determination is made of token sequences identifying said desired data fields.

3. The method for recognizing data fields in a data collection as set forth in claim 2, wherein the step of determining statistically significant token patterns further comprises:

determining if a sequence of tokens is significant by determining if said sequence of tokens occurs more than would be expected if said token sequence were to occur randomly.

4. The method for recognizing data fields in a data collection as set forth in claim 3, wherein said step of determining token sequence significance further comprises:
hypothesis testing.

5. The method for recognizing data fields in a data collection as set forth in claim 4, wherein said step of determining token sequence significance further comprises:
determining a probability of a token T being the next token in k number of sequences in n randomly-generated identical sequences.

6. The method for recognizing data fields in a data collection as set forth in claim 5, wherein said step of determining token T probability comprises:
determining a binomial distribution.

7. The method for recognizing data fields in a data collection as set forth in claim 6, wherein the step of determining statistically significant token patterns further comprises:
determining a significance level that the null hypothesis has been rejected, said significance level being $$\alpha = P(k \geq n_1) = \int_{n_1}^{\infty} P(x, \mu, \sigma) dx;$$

where
$\mu = np$
p is an overall probability of the token T occurring; and
$\sigma^2 = np(1-p)$.

8. A method for validating wrapper operation, the steps comprising:
executing a wrapper on a first data collection and extracting a first number N of training examples as a result thereof, said N training examples being indexed separately by a first index $t_i$;
learning a second number m of patterns describing common beginnings and endings of each data field of said training examples, said m patterns being indexed separately by a second index $m_1$;
executing said wrapper on a second data collection and extracting a third number n of test examples as a result thereof, said n test examples being indexed separately by a third index $k_i$;
$t_i$ providing a first distribution t;
$k_i$ providing a second distribution k;
comparing said first distribution t with said second distribution k;
verifying proper operation of said wrapper if said first distribution t is the same as said second distribution k within a significance level; and
verifying improper operation of said wrapper if said first distribution t is not the same as said second distribution k within said significance level; whereby
operation of said wrapper may be verified over time and due to changes in said first and second data collections.

9. The method for validating wrapper operation as set forth in claim 8 wherein said first and second data collections are similar.

10. The method for validating wrapper operation as set forth in claim 9 wherein said first and second data collections are the same.

11. A method for determining a new wrapper for a changed source of data, the steps comprising:

providing a set of training examples relevant to a data source prior to a change in said data source;
providing a set of pages from said data source after said change in said data source;
establishing data fields in said sets of data from said changed data source to provide a set of data candidates;
clustering said data candidates according to characteristic features to provide data candidate clusters;
scoring said data candidate clusters based on how similar each data candidate cluster is to each of said training examples;
selecting a data cluster having a highest score for a particular one of said training examples as corresponding to said particular training example; whereby
a new wrapper may be constructed by substituting said selected data cluster for said particular training example and generating rules appropriate for said substitution for said new wrapper.

12. The method for determining a new wrapper for a changed source of data as set forth in claim 11, wherein the step of establishing data fields in said sets of data further comprises:
learning a beginning token sequence pattern for each of said data fields; and
learning a terminating token sequence pattern for each of said data fields; whereby
each data field is determined by its beginning and terminating token sequence.

13. The method for determining a new wrapper for a changed source of data as set forth in claim 12, wherein the step of establishing data fields in said sets of data further comprises:
determining a mean and variance for a number-of-tokens distribution for in each data field.

14. The method for determining a new wrapper for a changed source of data as set forth in claim 13, wherein the step of establishing data fields in said sets of data further comprises:
scanning each page in said set of pages;
identifying all token segments beginning with one of said beginning token sequences and ending with one of said terminating token sequences to provide an initial set of data candidates;
evaluating said initial set of data candidates; and
eliminating ones of said initial set of data candidates having a number of tokens significantly different from an expectation derived from said number-of-tokens distribution to provide said set of candidates; whereby
said set of data candidates may be provided that is biased towards more relevant data candidates.

15. The method for determining a new wrapper for a changed source of data as set forth in claim 11, wherein the step of clustering said data candidates further comprises:
associating ones of said data candidates according to characteristic features selected from the group consisting of:
page position, adjacent tokens, and visibility to a user.

16. The method for determining a new wrapper for a changed source of data as set forth in claim 11, further comprising:
determining a page template for each page of said set of pages.

17. The method for determining a new wrapper for a changed source of data as set forth in claim 16, wherein the step of determining a page template further comprising:

determining data slots in said page template, said data slots expected to hold desirable data apart from said page template.

18. A method for recognizing data fields in a data collection, the steps comprising:
pre-processing the data collection to provide a syntactic hierarchy tree of tokens;
determining statistically significant token patterns in the data collection including determining if a sequence of tokens occurs more than would be expected if said token sequence were to occur randomly including determining a probability of a token T being the next token in k number of sequences in n randomly-generated identical sequences and including determining a significance level that the null hypothesis has been rejected, said significance level being:

$$\alpha = P(k \geq n_1) = \int_{n_1}^{\infty} P(x, \mu, \sigma) \, dx; \text{ where:}$$

$\mu$=np;
p is an overall probability of the token T occurring; and
$\sigma^2$=np(1-p);
providing examples of desired data fields; and
establishing a prefix tree for said desired data fields according to said statistically significant token patterns; whereby
determination is made of token sequences identifying said desired data fields.

19. A method for determining a new wrapper for a changed source of data, the steps comprising:
providing a set of training examples relevant to a data source prior to a change in said data source;
providing a set of pages from said data source after a change in said data source;
establishing data fields in said sets of data from said changed data source to provide a set of data candidates including learning a beginning token sequence pattern for each of said data fields, and learning a terminating token sequence pattern for each of said data fields so that each data field is determined by its beginning and terminating token sequence
determining a mean and variance for a number-of-tokens distribution for in each data field;
scanning each page in said set of pages;
identifying all token segments beginning with one of said beginning token sequences and ending with one of said terminating token sequences to provide an initial set of data candidates;
evaluating said initial set of data candidates;
eliminating ones of said initial set of data candidates having a number of tokens significantly different from an expectation derived from said number-of-tokens distribution to provide said set of candidates so that said set of data candidates may be provided that is biased towards more relevant data candidates;
clustering said data candidates according to characteristic features to provide data candidate clusters including associating ones of said data candidates according to characteristic features selected from the group consisting of: page position, adjacent tokens, and visibility to a user;
scoring said data candidate clusters based on how similar each data candidate cluster is to each of said training examples;
selecting a data cluster having a highest score for a particular one of said training examples as corresponding to said particular training example; whereby
a new wrapper may be constructed by substituting said selected data cluster for said particular training example and generating rules appropriate for said substitution for said new wrapper.

20. The, method for determining a new wrapper for a changed source of data as set forth in claim 19, further comprising:
determining a page template for each page of said set of pages;
determining data slots in said page template, said data slots expected to hold desirable data apart from said page template; and
clustering said data candidates according to an index of a page template slot in which a data candidate appears.

21. A method for wrapping a first database, the steps comprising:
providing a second database, said second database similar to said first database;
providing a wrapper for said second database, said wrapper extracting information of interest from said second database, said wrapper having a first set of rules for wrapping said second database;
wrapping the first database with said wrapper for said second database;
evaluating effectiveness of said wrapper in wrapping the first database; and
reinducing ineffective rules of said wrapper when wrapping said first database to generate a second set of rules comprising a second wrapper, said second wrapper better extracting information from said first database; whereby
the first database is more easily wrapped by reinducing wrapper rules applicable to a similar database.

22. The method for wrapping a first database as set forth in claim 21, where the step of reinducing ineffective rules of said wrapper for said second database further comprise:
using pages from said second database to provide a set of training examples relevant to the first database;
providing a set of pages from the first database;
establishing data fields in said set of pages from the first database to provide a set of data candidates;
clustering said data candidates according to characteristic features to provide data candidate clusters;
scoring said data candidate clusters based on how similar each data candidate cluster is to each of said training examples;
selecting a data cluster having a highest score for a particular one of said training examples as corresponding to said particular training example; whereby
a new wrapper for the first database may be constructed by substituting said selected data cluster for said particular training example and generating rules appropriate for said substitution for said new wrapper.

* * * * *